April 19, 1960
V. F. SEPAVICH
2,933,108
PATTERN CHAIN LINKS FOR LOOMS
Filed Oct. 6, 1958
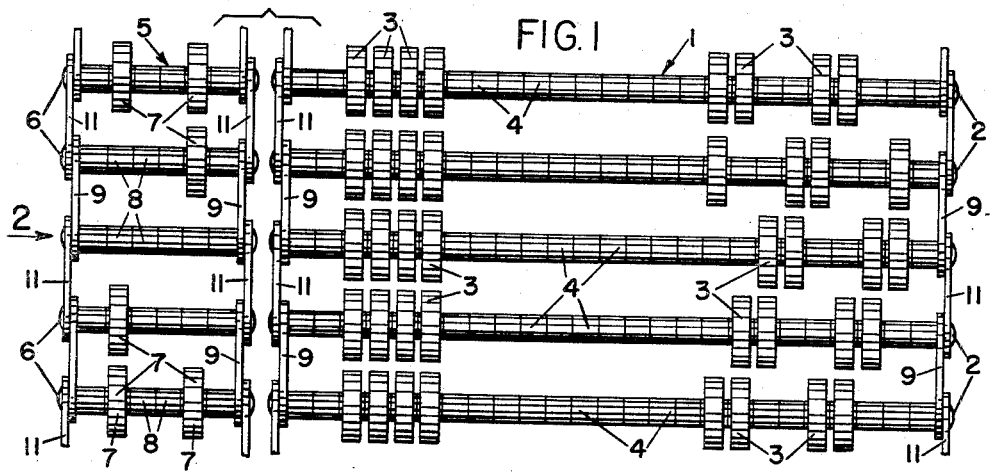
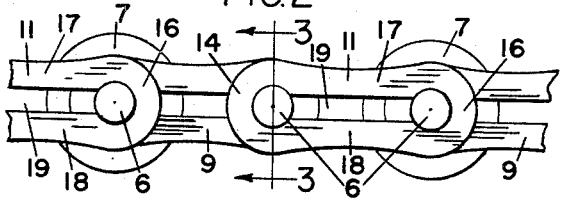
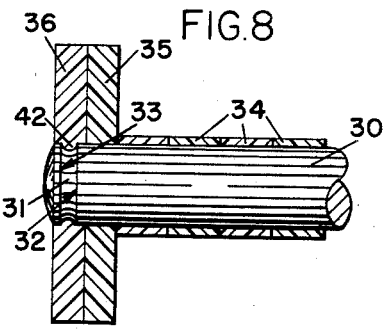
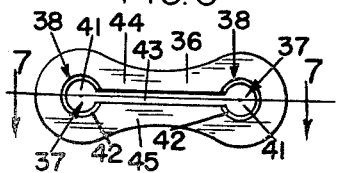
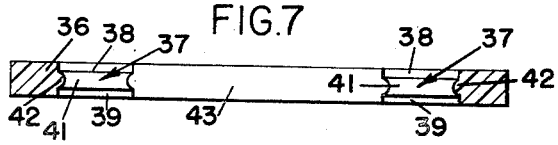
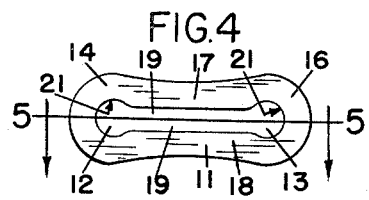
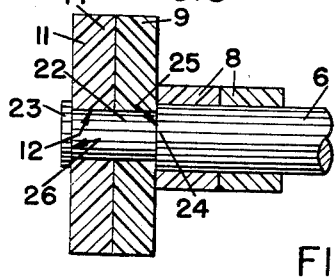
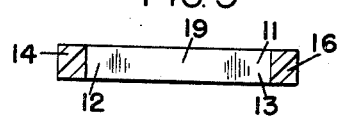
INVENTOR
VICTOR F. SEPAVICH
Chas. T. Hawley
ATTORNEY United States Patent Office 2,933,108
Patented Apr. 19, 1960

2,933,108

PATTERN CHAIN LINKS FOR LOOMS

Victor F. Sepavich, Worcester, Mass., assignor to Crompton & Knowles Corporation, Worcester, Mass., a corporation of Massachusetts Application October 6, 1958, Serial No. 765,637

11 Claims. (Cl. 139—333)

This invention relates to improvements in pattern chains for looms and more particularly relates to improvements in the links forming part of the chain, and it is the general object of the invention to provide links made of firm but resilient material capable of holding themselves to the rods or bars which also form part of the chain.

Certain types of looms that have generally gone into use employ two sets of pattern chain mechanisms adjacent each other, one set for use in conjunction with the usual shuttle boxes and the other set for use in conjunction with the usual harness frames, the chains consisting of sinkers and rollers on rods which are connected by rigid links to form an endless pattern chain. These links are maintained on the rods by special fasteners as cotter pins, spring clips, special locking links or the like, which not only add to the cost of the chains but also require that the rods be of such length that the rods of one chain engage and interfere with the movement of the rods of the adjacent chain with resultant excessive wear, fracture and breakage. It is, therefore, an object of the invention to circumvent these disadvantages by connecting the rods with self-locking semi-rigid links which not only reduces the number of parts used in and the cost of the chain but also maintains the length of the rods at a minimum so that they do not interfere with each other during loom operation.

Another object of the invention is to provide the link with a hole at each end thereof connected by a slot, the relationship between the holes and slots and rods being such as to effect self-locking of the link to the rods when they are assembled on the latter.

Still another object of the invention is to make the link such that the holes are smaller than the largest diameter of the rod and the holes snugly fit the reduced part and the slot is of less height than the reduced part to effect positive locking of the link to the rod independently of any other link.

A further object of the invention is to make the link of resilient material such as nylon, whereby the height of the slot may be increased to effect enlargement of the holes for easy application and removal of the link with respect to the rod.

A still further object of the invention is to make the links identical so that they are interchangeable and can be applied to the rods end for end or back to front and front to back while maintaining the self-locking features regardless of which order the links are placed on the rods.

A still further object of the invention is to provide the link with two portions between the ends thereof to define a slot of less height than the smallest diameter of the rod to hold the rods in constant spaced relationship with each other to maintain proper timing of the chain during its movement during loom operation.

A further object of the invention is to provide inner and outer links to connect the bars, the outer links having a hole at each end thereof, certain parts of each hole snugly fitting the largest diameter of a rod and certain parts of each hole snugly fitting a narrow peripheral groove at each end of a rod to effect self-locking to the rod and to maintain the inner link on the rod.

Other objects and advantages of invention will appear as the description proceeds, and in the accompanying drawings, wherein two embodiments of the invention are shown.

Fig. 1 is a partial plan view of two sets of pattern chains having the preferred form of the invention applied thereto.

Fig. 2 is an enlarged fragmentary view looking in the direction of arrow 2, Fig. 1.

Fig. 3 is an enlarged vertical section taken on line 3—3, Fig. 2.

Fig. 4 is a plan view showing one of the links of the preferred form.

Fig. 5 is a sectional view on line 5—5 of Fig. 4.

Fig. 6 is a plan view of one of the links of the modified form of the invention.

Fig. 7 is an enlarged sectional view on line 7—7 on Fig. 6, and

Fig. 8 is an enlarged vertical section similar to Fig. 3 but showing the modified form of the invention.

Referring particularly to Fig. 1, a pattern chain is generally designated by numeral 1 and consists of a series of rods 2 on which are mounted the usual rollers 3 and sinkers 4 to cooperate with well known mechanism not shown to effect lowering and raising of the usual harness frames not shown. A second pattern chain moving in timed relationship with chain 1 is generally indicated at 5 and consists of a series of rods 6 having mounted thereon rollers 7 and sinkers 8 to work with well-known mechanism not shown to effect raising and lowering of shuttle boxes well known in the art but not shown herein. The rods of both chains are connected by a series of inner links 9 and a series of outer links 11 to form an endless pattern chain. Except for the rods 2 and 6, and links 9 and 11 the matter thus far described is of usual construction and forms no part of the present invention.

In carrying the present invention into effect the ends of rods 2 and 6 are identical as are links 9 and 11, and it is deemed only necessary to describe one end of a rod, namely rod 6, and one of said links, namely link 11, and the cooperation therebetween for a full understanding of the invention. Referring to Figs. 2–5, link 11 is provided with holes 12 and 13 in left and right ends 14 and 16 thereof respectively. Upper and lower portions 17 and 18 between ends 14 and 16 define a slot 19 therebetween connecting holes 12 and 13. Each link is of substantial width to form substantial bearing surfaces 21 to receive a rod. The links are made of resilient material, preferably nylon, for a purpose to be described.

Referring particularly to Fig. 3, rod 6 has at each end thereof a reduced diameter part 22 between the larger diameter parts 23 and 24 forming shoulders 25 and 26 respectively between which one end of a link 9 and one end of a link 11 snugly fit when assembled thereto. The shoulders are capable of maintaining links 9 and links 11 respectively in horizontal alignment with each other.

Holes 12 and 13 have a diameter smaller than the diameters of parts 23 and 24 and the height of the slot is less than the diameter of part 22, and when the links are to be connected to the rods, it is only merely necessary to spread the slot to move portions 17 and 18 away from each other to effect enlargement of holes 12 and 13 whereupon the ends of the links can be easily slipped over part 23 and onto part 22 to snugly fit the latter when the portions are released. Because the links are resilient, portions 17 and 18 can be moved in a direction transverse of slot 19 from normal to abnormal position and back again to normal for application of or removal of the links from the rods.

The relationship of the holes and slot of each link with respect to the rods is such that, when the links are applied to the rods, they effect self-locking thereto and since each link is identical they are interchangeable and can be assembled to the rods in any order, i.e., end for end, from back to front and front to back and still retain the locking relationship between the links and the rods. Because each link is identical and each link is self-locking, special fasteners need not be used to form a complete endless chain.

Although the links are made of resilient material, they are sufficiently firm to safely resist elongation thereof due to the weight of the other components of the chain and sufficiently firm to maintain the rods in spaced relationship to each other.

In the modified form of the invention, see Figs. 6–8, a rod 30 has a narrow peripheral groove 31 at each end thereof, only one end of the rod being shown herein. Rod 30 is formed with a pair of facing shoulders 32 and 33 to define groove 31. Excepting for the width of groove 31, rod 30 is similar to rod 6 and mounts sinkers 34 and rollers (not shown) both of which are similar to those described in the preferred form. An inner link 35 is of usual construction except for its width and may be made of resilient material such as nylon and forms no part of the present invention except as used in combination with an outer link 36.

Outer link 36 has similar holes at each end thereof generally indicated at 37. Each hole is formed in three parts, see Fig. 7, upper and lower parts, parts 38 and 39 being of the same diameter as the larger diameter of rod 30 and the third part 41 being of a diameter to closely fit the diameter of groove 31. A bead 42 is integral with the link and extends between parts 39 and 40 into hole 41 to make the latter of less diameter than the largest diameter of the rod. A slot 43 connects holes 37 to form upper and lower positions 44 and 45 between the ends of the link. As in the preferred form, link 36 is made of resilient material such as nylon and the application and removal of link 36 from rod 30 may be the same as described for the preferred form. In assembling the modified form of the invention, link 35 which has a hole at each end slightly larger than the largest diameter of the rod will be slipped on a pair of adjacent rods to butt against a sinker or roll thereon, after which links 36 may be applied to the rods as were the links in the preferred form and beads 42 will effect locking of the links to the rods and maintain link 35 on the rods. Since parts 38 and 39 of hole 37 can fit rod 30, each link 36 may be applied by a snap-on action by aligning either of said parts with rod 30 and merely pushing on the link to cause bead 42 to slide over the end of rod 30 to effect expansion of part 41, and upon continued pushing bead 42 will snap off the end of rod 30 into locking relationship with groove 31.

Both types of links 11 and 35 are self locking and are symmetrical about their axes such that no particular attention is needed when applying the links as regards which end of a link is used for any rod or whether the link is reversed or not.

From the foregoing it will be seen that simple means have been provided to connect the rods to form an endless chain, the means being self-locking in both forms and made of resilient material to permit movement of certain parts of the link away from each other for easy application to or removal from the rods. Moreover the links are made in a manner such that they are interchangeable and can be assembled to the rods in any order whether end for end or reversed, thus eliminating excessive care during assembly.

Having thus described and ascertained the nature of the invention, it will be understood that changes and modifications may be made therein without departing from the spirit and scope of the invention, and the invention is not limited to the details herein disclosed but what is claimed is:

1. In a loom pattern chain having a series of rods with rollers and sinkers thereon and having a reduced diameter at the ends thereof between a pair of facing shoulders formed by the largest diameter, self-locking semi-rigid means connecting said rods to form an endless chain and having at each end thereof a hole of less diameter than said largest diameter to snugly fit said reduced diameter and also having a slot of less height than said reduced diameter connecting said holes, said means capable of being extended abnormally between said holes in a direction transverse of said slot to effect enlargement of said holes in order to slip the latter over the largest diameter whereupon said means are then returned to normal to snugly grip said reduced diameter to effect locking of said means to said rods.

2. The loom pattern chain set forth in claim 1 wherein said means are resilient links each of which has a pair of portions between said holes to form a slot therebetween of less height than said reduced diameter, said portions capable of being moved in a direction away from each other due to said resiliency to effect enlargement of said height and said holes for application to or removal of said links from said reduced diameters of said rods.

3. The links set forth in claim 2 wherein said portions of each link are spaced from each other in a manner to maintain a pair of said rods, one in each of said holes in spaced relationship with each other when said link is applied to said rods.

4. The loom pattern chain set forth in claim 1 wherein said means are self-locking nylon links each of which is symmetrical about all of its axes to permit end for end, back to front and front to back application to said rods, each link being effective to lock itself thereto irrespective in what order said application is made.

5. In a loom pattern chain having a series of rods with spacers and rollers thereon and having a reduced diameter between a pair of facing shoulders formed by the largest diameter, self-locking means provided with a pair of holes and a slot therebetween and connecting said rods between said shoulders to form an endless chain, one end of said means being on one of said rods and the other end thereof being on an adjacent rod, and a series of links having one end of a link thereof between said one end of said means and one of said shoulders on one of said rods and another link of said series having an end thereof between said other end of said means and one of said shoulders on said adjacent rod, each of said ends of said locking means and said links capable of holding themselves to their corresponding rod independently of each other due to the holes and slot relationship to said rods.

6. The loom pattern chain as set forth in claim 5 wherein said means is identical to each of said links in said series whereby said means and said series of links are interchangeable in any order whatsoever and effect self-locking to said rods when interchanged.

7. The loom pattern chain set forth in claim 5 wherein said self-locking means is a link having one of said holes at each end thereof, the diameters of which are less than that of the largest diameter of each rod and having said slot connecting said holes of less height than any diameter of said rods, the relationship between the holes and the slot and the rod being such to effect self-locking of said link to said rods when assembled to the latter.

8. In a loom pattern chain having a plurality of rods with rollers and sinkers thereon and a series of links between the rollers or sinkers and the end of said rods depending upon the pattern and location of said rollers and sinkers on said rods, each rod having a narrow peripheral groove adjacent each end thereof between a pair of facing shoulders defining said groove, a self-locking snap-on outer link each end of which is capable of holding itself to said rods and having a hole therein to fit said rod and connected by a slot narrower than a diameter formed by said groove, and means on said outer link to effect said locking of the latter to said rods to hold said inner links on said rods.

9. The pattern chain set forth in claim 8 wherein said means is a bead integral with said link and extending into said hole between the sides of the link to form a part of the hole with a diameter less than that of the rod, said bead snugly fitting said groove and effective to lock said link to said rod when assembled thereto.

10. The pattern chain set forth in claim 8 wherein said outer links are resilient but firm nylon material to permit opening of said slot to effect enlargement of said holes and spreading of the ends of the beads away from each other in order to be able to apply or remove said links from said rods.

11. The pattern chain set forth in claim 8 wherein each end of said links is formed with a hole such that parts of each hole have a snug fit with the outer diameter of said rods and another part of said hole being smaller than and between said parts to have a snug fit with diameter of said groove.

References Cited in the file of this patent

UNITED STATES PATENTS

| 1,565,085 | Furgal | Dec. 8, 1925 |
| 2,488,144 | Shortland | Nov. 15, 1949 |

FOREIGN PATENTS

| 749,828 | Great Britain | June 6, 1956 |
| 941,883 | Germany | Apr. 19, 1956 |